United States Patent [19]
McGuire et al.

[11] 3,862,894
[45] Jan. 28, 1975

[54] METHOD OF ELECTRODEPOSITING NON-AQUEOUS CATIONIC DISPERSIONS AND ARTICLES PRODUCED THEREBY

[75] Inventors: Kathleen A. McGuire, Natrona Heights; Charles M. Hansen, Monroeville; Roger M. Christenson, Gibsonia, all of Pa.

[73] Assignee: PPG Industries, Inc., Pittsburgh, Pa.

[22] Filed: Jan. 14, 1972

[21] Appl. No.: 218,004

[52] U.S. Cl. ............................................. 204/181
[51] Int. Cl. .............................................. B01k 5/02
[58] Field of Search ................................... 204/181

[56]         References Cited
         UNITED STATES PATENTS
3,669,859    6/1972    Merrill ............................. 204/181
3,676,383    7/1972    Scala et al. ...................... 204/181
3,679,564    7/1972    Dowbenko et al. .............. 204/181

*Primary Examiner*—Howard S. Williams
*Attorney, Agent, or Firm*—George D. Morris

[57]              ABSTRACT

This invention relates to electrodepositable compositions and the method of electrodepositing these compositions.

The electrodepositable compositions of the invention comprise non-aqueous electrodepositable coating compositions comprising a non-aqueous dispersion of a polymer containing basic nitrogen atoms in an organic dispersing liquid in the presence of a dispersion stablizer and optionally a coupling solvent.

24 Claims, No Drawings

A METHOD OF ELECTRODEPOSITING NON-AQUEOUS CATIONIC DISPERSIONS AND ARTICLES PRODUCED THEREBY

BACKGROUND OF THE INVENTION

It is known that electrophoretic deposits may be obtained by applying a direct electric field between two electrodes immersed in a suitable liquid suspension, which causes a migration of the suspended phase toward one of the electrodes and the deposition of a coating or form at that electrode. In order to secure migration of suspended particles under the influence of an electric field, the particles must carry an effective electrical charge, and consequently, the liquid phase must carry a corresponding charge of the opposite sign to preserve electrical neutrality. This charge is generally attributed to the sorption of ions or ionizable substances. Thus, for example, in the formation of alkaline earth carbonate suspensions from solutions of their nitrates, preferential adsorption of alkaline earth cations is said to take place on the carbonate particles so that they acquire a positive charge. However, on the other hand, some synthetic resin latexes are made up with sodium alkyl sulfates as dispersing agents; the alkyl sulfate ion is apparently adsorbed onto the polymer, giving it a negative charge. In the case of natural rubber, the particles may be kept in aqueous suspension by adsorbed proteins, which are capable of yielding either positive or negative charges depending upon the pH of the latex. When particles migrate to the cathode, the process is commonly referred to as cataphoresis and when they migrate toward the anode, as anaphoresis. It will be noted that the charged particles may be suspended in both aqueous and organic media. However, organic media have at least one major advantage in contrast with the aqueous media systems, that is, there are fewer or no secondary electrode reactions involved, and, hence, substantially higher voltages may be employed to compensate for the lower conductivities. Thus, by employing non-aqueous media, harmful side reactions can be avoided.

In recent years, numerous patents have been granted relating to both anionic and cationic electrodepositable aqueous solution and/or dispersion coating compositions. The theory most frequently postulated for the mechanism of these aqueous systems is that on deposition a metal salt is formed due to oxidation of the anode in anionic systems and coagulation or a salting-out effect due to the excess hydroxyl ion content in cationic systems. In such systems, the deposition is irreversible and provides for films that have insulating characteristics.

Likewise, there is literature relating to polymer deposition from non-aqueous media. For example, suspension for electrophoretically coating a metal base consisting of alkaline earth metal carbonates of barium, strontium and calcium and a minor amount of an alkaline earth metal nitrate suspended in a solution of polymethyl methacrylate dissolved in diethyl carbonate are known in the art. However, when utilizing such compositions, the coating bath is normally made by the negative electrode and the energized article to be coated in the anode.

Numerous non-aqueous polymers will not migrate under an electrical potential due to the lack of an adequate charge on the dispersion particles. Therefore, it was surprising to learn that by incorporating into the dispersion polymers small amounts of basic nitrogen atoms that a suffice charge is thereby imparted to enable the dispersion particles to migrate and disposit on a counter electrode when subjected to an electrical potential.

DESCRIPTION OF THE INVENTION

Now it has been discovered that non-aqueous dispersions of acrylic polymers, which contain basic nitrogen atoms can be electrodeposited at the cathode to provide coatings that, when cured, exhibit decorative and protective characteristics that are desirable and also provide that are resistant to alkali and acid attacks.

More particularly, this invention relates to electrodepositable compositions and the method of electrodepositing these compositions. The composition herein comprise non-aqueous dispersion of a polymer containing basic nitrogen atoms in an organic dispersing liquid in the presence of a dispersion stablizer and optionally a coupling solvent.

These non-aqueous polymers are unusual and desirable in the field of industrial electrocoating in that they are not only non-aqueous but that the deposition reaction is reversible, that is, a salt is not formed and when the current is reversed the migration is likewise reversed and that films having a substantial increase in thickness, when compared to base neutralized aqueous electrodepositable systems, can readily be produced. The film thickness of the compositions of this invention appears to be a linear function of the bath dwell time and the voltages employed. In addition, another advantage of the non-aqueous dispersions of this invention is that they consume very little current when compared to conventional base neutralized aqueous electrodepositable systems. A further advantage of non-aqueous dispersions is that there is no need to provide for continuous agitation during the coating process. And still a further advantage is obtained due to the lack of necessity for post-rinsing of the coated article. Another major advantage of the dispersions herein is that they can be electrodeposited over primed substrates.

Methods of making non-aqueous polymer dispersions of the type utilizable in the compositions and method of the invention are known in the art.

In general, the process for making dispersions of polymers particularly acrylic polymers in organic solvents is by dispersion polymerizing an acrylic monomer in an organic liquid in which it is soluble, but in which the resulting polymer is insoluble and forms disperse polymer particles. The reaction is carried out in the presence of a stabilizer having in its molecule (i) a constituent which becomes associated with the disperse polymer particles and (ii) a constituent having a pendant chain-like structure which is solvated by the organic liquid and provides a stabilizing sheath around the polymer particles.

By "acrylic polymer" is meant a polymer of an ester or amide of acrylic or methacrylic acid or a copolymer of such an ester with another copolymerizable monomer. Suitable esters include those of alcohols containing 1–8 carbon atoms, such as methyl acrylate, methyl methacrylate, ethyl acrylate, n-butyl methacrylate, octyl acrylate lauryl methacrylate and 2-ethoxy-ethyl methacrylate. Suitable amides include acrylamide, methacrylamide, tertiary butyl acrylamide and primary alkyl acrylamides. Mixtures of such esters or amides may be copolymerized or one or more of the esters may be copolymerized with a higher alkyl ester or amide of acrylic or methacrylic acid or with another monomer containing a copolymerizable vinyl group, e.g., itaconate esters, maleate esters and allyl compounds. The preferable acrylic polymers utilized in the composition of this invention are the alkyl methacrylates and, more specifically, poly(methyl methacrylate) and copolymers of methyl methacrylate and 2-ethyl hexyl acrylate.

The polymerization is effected in an organic dispersing liquid which is primarily a hydrocarbon medium consisting essentially of liquid aliphatic hydrocarbons. A single aliphatic hydrocarbon or a mixture of one or more may be employed. To the extent that any particular polymer produced is insoluble in the hydrocarbon medium resulting, the essentially aliphatic hydrocarbon may be modified by the incorporation of other solvent materials, such as aromatic or naphthenic hydrocarbons, and in certain instances the amount of such non-aliphatic component may attain as high as 49 percent by weight of the entire liquid medium. However, the liquid medium preferably consists essentially of aliphatic hydrocarbons and, in general, the compositions of the present invention contain less than 25 percent by weight based on the weight of the liquid medium of an aromatic hydrocarbon and often none at all.

It is essential that the hydrocarbon be of liquid character, but it may have a wide boiling range from a minimum of about 30°C. (in which case, high pressures may be needed in the polymerization) to a maximum which may be as high as 300°C. For most purposes, the boiling point should be from about 50° up to about 235°C. Where the coatings are to be cured with relatively high temperature drying ovens, the hydrocarbon system may have extremely high boiling points, such as from 275° to 300°C.

When the polymerization is complete, the acrylic polymer dispersion may be thinned with an organic solvent thinner composition and electrodeposited onto the surface to be coated. The solvent thinner generally is comprised of two components, one component is a coupling solvent for the acrylic polymer, which is generally recognized as a coalescing solvent, and the second component is a liquid aliphatic hydrocarbon. Some examples of the coupling solvent are ethoxyethyl acetate (Cellosolve acetate), butyl Cellosolve acetate, 2,2-,4-trimethyl-1,3-pentanediol monoisobutyrate, acetone, toluene, methyl ethyl ketone, methyl isobutyl ketone, methyl isoamyl ketone, and the like.

Some examples of liquid aliphatic hydrocarbons useful in the thinning solvents are hexane, heptane, octane, nonane, pentane, and the like.

As previously stated the dispersed polymer should contain basic nitrogen atoms. These may be incorporated into the polymer at the time of initial polymer formation as by the use of a nitrogen containing unsaturated monomer to form a polymer (i.e., homopolymer or interpolymer) or may be introduced into a polymer after its formation, as by the reaction of reactive sites on the polymer molecule with a compound which contributes basic nitrogen groups to the resultant polymer.

As previously stated, the non-aqueous dispersions are formed by preparing a polymer dispersed for example by the non-aqueous polymerization technique previously described.

One technique useful in preparing compositions useful in this invention is to prepare a polymer contains free carboxyl groups, for example an interpolymer of an alpha, beta-ethylenically unsaturated carboxylic acid and at least one other monomer and thereafter modifying the polymer by reaction with an imine to introduce basic nitrogen groups. When desirable the imine may be added during the polymerizing process.

The polymerizable monomer which is polymerized in this process may be any ethylenically unsaturated monomer such as methyl methacrylate, ethyl acrylate, styrene, butyl acrylate, 2-hydroxy ethyl acrylate and methacrylate, 2-hydroxypropyl acrylate and methacrylate, 2-ethyl hexyl acrylate and methacrylate, acrylonitrile, acrylamide, acrylic acid, methacrylic acid, vinyl toluene, and many other. A more complete description of these monomers may be found in U.S. Pat. No. 3,037,963. A particularly preferred ethylenically unsaturated monomer to be polymerized is methyl methacrylate.

The polymerizable ethylenically unsaturated carboxylic acid may be any acidic acrylic compound such as acrylic acid, methacrylic acid, crotonic acid, 3-butenoic acid, itaconic acid, and the like. The carboxylic acid group contributed by this monomer may then be reacted with a compound containing basic nitrogen groups such as an imine.

Any imine-containing compound which will react with a carboxy group may be used. Generally, the imine-containing compounds are the alkylene imines and substituted alkylene imines. The preferred class of such imines are those of the formula:

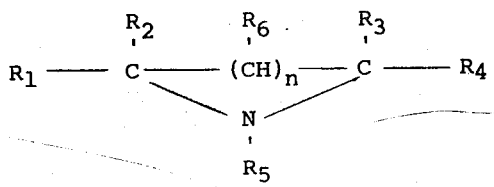

where $R_1$, $R_2$, $R_3$, $R_4$ and $R_5$ are each hydrogen; alkyl, such as methyl, ethyl, propyl, or the like, having, for example, up to about 20 carbon atoms; aryl, such as phenyl or the like; alkaryl, such as tolyl, xylyl, or the like, or aralkyl, such as benzyl, phenethyl or the like. $R_6$ in the above formula is hydrogen or a lower alkyl radical usually having not more than about six carbon atoms, and $n$ is an integer from 0 to 1.

It is intended that the groups designated by the above formula include substituted radicals of the classes indicated where the substituent groups do not adversely affect the basic nature of the imine in the reaction. Such substituents can include the groups such as cyano, halo, amino, hydroxy, alkoxy, carbalkoxy, and nitrile. The substituted groups may thus be cyanoalkyl, haloalkyl, aminoalkyl, hydroxy alky, alkoxyalkyl, carbalkoxyalkyl, and similar substituted derivaties of aryl, alkaryl and aralkyl groups where present.

It will be recognized by those skilled in the art that compounds containing certain combinations of the above groups cannot be obtained, for example, because of factors such as steric hindrance or intra-molecular interaction. For this reason, in most of the compounds of the class described, several of the groups designated by $R_1$ through $R_6$ represent hydrogen. However, the efficacy of the various alkyleneimine (whether or not within the above formula) does not depend upon the particular nature of any of the substituents, but rather the imine linkage; thus, beneficial results are obtained with interpolymers modified by any of those compounds within the above class.

It should be recognized that in making polymers of the present invention where an imine is employed, that imination of the carboxyl groups may be performed during, prior thereto, or subsequently to the polymerization reaction.

A number of specific examples of alkyleneimines within the class described are as follows:

Ethylenimine (aziridine)
1,2-propylenimine (2-methyl aziridine)
1,3-propylenimine (azetidine)
1,2-dodecylenimine (2-decyl aziridine)
1,1-dimethyl ethylenimine (2,2-dimethyl aziridine)
Phenyl ethylenimine (2-phenyl aziridine)
Tolyl ethylenimine (2-(4-methylphenyl)aziridine)
Benzyl ethylenimine (2-phenylmethyl aziridine)
1,2-diphenyl ethylenimine (2,3-diphenyl aziridine)
Hydroxyethyl ethylenimine (2-(2-hydroxyethyl)aziridine)
Aminoethyl ethylenimine (2-(2-aminoethyl)aziridine)
2-methyl propylenimine (2-methyl aziridine)
3-chloropropyl ethylenimine (2-(3-chloropropyl)aziridine)
p-chlorophenyl ethylenimine (2-(4-chlorophenyl)aziridine)

As mentioned hereinabove, the imine component may react with the carboxylic acid component before, during, or after the polymerization reaction. While often the imine reaction is carried out after the polymer has been produced, it has been found that some saving of time without any sacrifice in properties is achieved by carrying out the reaction with imine concurrently with the interpolymerization reaction. In this embodiment, the imine is added to the polymerization mixture at any point prior to the completion of the polymerization reaction. Preferably, the imine is added after the monomers, but before the polymerization is substantially advanced.

Because of their availability and because they have been found to be among the most effective, the preferred imines are alkyleneimines and substituted alkyleneimines having two to four carbon atoms, and especially ethylenimine, 1,2-propylenimine, and N-hydroxyethyl ethylenimine.

An alternative method of introducing basic nitrogen groups is to employ at least a portion of the monomers utilized to form the disperse polymer of an ethylenically unsaturated basic nitrogen containing monomer. For example, primary secondary and tertiary nitrogen-containing alpha, beta-ethylenically unsaturated aminoalkyl monomers that may be utilized include acrylate and methacrylate esters having one to six carbon atoms in the alkyl radical, such as the aminomethyl, aminopropyl, and aminohexyl esters; mono-N,N-di($C_1$-$C_4$ alkylamino)-($C_1$-$C_6$ alkyl)esters, such as mono-(N,N-dimethylamine)ethyl ester, mono-(N,N-dimethylamino)ethyl ester and mono-(N,N-dimethylamine)hexyl ester. Also, monomers wherein the vinyl group is attached to the following radicals which include 2H-pyrrolyl, pyrrolyl, imidazolyl, pyrazolyl, pyridyl, pyrazinyl, pyrimidinyl, and the like are readily employed. Examples of such monomers include two monomers that have been found to be particularly useful in producing the interpolymers utilized herein are N,N-dimethylaminoethyl methacrylate and N-vinylimidazole.

Other suitable monocylic compounds are N-vinylpyrazole, N-vinylimidazoline, N-vinylpiperidine and analogous compounds which bear methyl, ethyl, or propyl as substituents on carbon atoms in the ring. Examples of suitable bicyclic compounds are N-vinylindole and its lower C-alkyl and C-alkoxy analogues. Also useful acrylonitrile and/or methacrylonitrile and the salts of symmetrical and asymmetrical mono-(N,N,N-tri $C_1$-$C_4$-alkyl ammonium) $C_1$-$C_6$ alkyl esters of acrylic acid and/or methacrylic acid. Likewise, various polymers quaternary ammonium compounds available on market may be employed.

The organic dispersing liquid herein is an aliphatic hydrocarbon solvent such as those which are discussed above Examples of liquid aliphatic hydrocarbon solvents useful as dispersing liquids are pentane, hexane, heptane, octane, and the like.

The dispersion stabilizer used to prepare the polymer dispersion described is a branched copolymer comprising two types of polymer components of which one segment is solvated by the organic dispersing liquid and not associated with polymerized particles of the polymer and the second type is an anchor polymer of different polarity to the first type and being relatively non-solvatable by the organic dispersing liquid and capable of anchoring with the polymerized particles of the polymer, said anchor polymer containing pendant groups capable of copolymerizing with any ethylenically unsaturated monomers in forming the said polymer.

The dispersion stabilizer comprises two segments. The first segment (A) comprises the reaction product of (1) a long-chain hydrocarbon molecule which is solvatable by the dispersing liquid and contains a terminal reactive group and (2) an ethylenically unsaturated compound which is copolymerizable with the ethylenically unsaturated monomer to be polymerized and which contains a functional group capable of reacting with the terminal reactive group of the long-chain hydrocarbon molecule (1).

Generally, the solvatable segment (A) is a monofunctional polymeric material of molecular weight of about 300 to about 3,000. These polymers may be made, for example, by condensation reaction producing a polyester or polyether. Preferably, the polyester reaction is a simple one involving a mono-hydroxylic mono-carboxylic monomer, such reactions leading to components which are strictly monofunctional with respect to one or to the other group. The most convenient monomers to use are hydroxy acids or lactones which form hydroxy acid polymers. For example, a hydroxy fatty acid, such as 12-hydroxystearic acid may be polymerized to form a non-polar component solvatable by such non-polar organic liquids as aliphatic and aromatic hydrocarbons. The polyhydroxy stearic acid may then be reacted with a compound which is copolymerizable with the acrylic monomer to be polymerized such as glycidyl acrylate or glycidyl methacrylate. The glycidyl group would react with the carboxyl groups of the polyhydroxy stearic acid and the polymer segment (A) would be formed.

Somewhat more complex, but still useful, polyesters may be made by reacting diacidss with diols. For example, 1,12-decanediol may be reacted with sebacic acid or its diacid chloride to form a component solvatable by aliphatic hydrocarbons.

The preferred polymeric segment (A) of the dispersion stabilizer is formed by reacting poly-12-hydroxy stearic acid with glycidyl methacrylate.

The second polymeric segment (B) of the dispersion stabilizer is of different polarity to the first segment (A) and, as such, is relatively non-solvated by the dispersing liquid and is associated with or capable of anchoring onto the acrylic polymer particles formed by the polymerization and contains a pendant group which is copolymerizable with the acrylic monomer. This anchor segment (B) provides around the polymerized particles a layer of the stabilizer. The solvated polymer segment (A) of which estends outwardly from the surface of the particles provides a solvated barrier which sterically stabilizes the polymerized particles in dispersed form.

The anchor segment (B) may comprise copolymers of (1) compounds which are readily associated with the acrylic monomer to be polymerized such as acrylic and methacrylic esters such as methyl acrylate, methyl methacrylate, ethyl acrylate, ethyl methacrylate, butyl acrylate, butyl methacrylate, 2-ethylhexyl acrylate, octyl methacrylate, and the like, with (2) compounds which contain groups copolymerizable with the acrylic monomer to be polymerized and which contain groups which are reactive with the polymeric segment (A), such as glycidyl-containing acrylates and methacrylates, such as glycidyl acrylate and glycidyl methacrylate. These copolymers are further reacted with polymerizable ethylenically unsaturated acids such as acrylic acid, methacrylic acid, 3-butenoic acid, crotonic acid, itaconic acid, and the like, which contain pendant groups which are copolymerizable with the acrylic monomer.

The preferred polymeric segment (B) is a terpolymer of methyl methacrylate, glycidyl methacrylate, and methacrylic acid.

The segments (A) and (B) are usually separated entities, the segment (A) being attached to the backbone of the graft copolymer and the segment (B) being carried in or on the backbone. However, in some cases, the segments (A) and (B) may be attached one to the other. For example, segment (A) may be attached to segment (B) by ionized ionic linkages.

Also, when desirable a coupling solvent may be employed as it is has been discovered that the coupling solvent will increase the deposition rate of the dispersion particles, thus provide for increased film build. The exact theory of the mechanism is not known, however, it is believed that since coupling solvent is polar in nature that when the said solvent encapsulates the dispersion particles that a substantial charge is imparted thereon. This increased charge thus provides for the increased deposition rate.

The coupling solvent herein has a "limited affinity" for the interpolymer and a "limited solubility" in water. The coupling solvent generally comprises about ⅓, by weight, of the total solvent.

"Limited affinity", as that term is used herein, means that the dispersant has a swelling effect upon the interpolymer rather than being a true solvent for said vehicle.

"Limited solubility" as that term is used herein, means that the coupling solvent is only slightly soluble in water. Generally coupling solvents are regarded as having limited solubility if they are soluble in water at 20°C. to an extent of about 50 weight percent or less.

Coupling solvents that may be employed in this invention include such ketones as: methyl ethyl ketone, methyl n-propyl ketone, diethyl ketone, mesityl oxide, cyclohexanone, methyl isobutyl ketone, methyl n-butyl ketone, ethyl n-butyl ketone, and methyl n-amyl ketone, and the like;

ethers and polyethers, such as: ethyl ether, diethyl Cellosolve, and the like;

esters such as methyl formate, ethyl formate, methyl acetate, ethyl acetate, Cellosolve acetate, propylene carbonate, n-propyl acetate, isopropyl acetate, Cellosolve acetate (ethylene glycol monoethyl ether acetate), butyl Cellosolve acetate (ethylene glycol monolautyl ether acetate), ethyl glycol diacetate, butyl carbital acetate, and the like;

alcohols such as: n-butyl alcohol, sec-butyl alcohol, isopropyl alcohol, 3-pentanol, cyclohexanol, methyl amyl alcohol, benzyl alcohol, methylphenylcarbinol, 2-ethyl-1,3-hexanediol, and the like;

Nitrocarbons such as: Nitromethane, nitroethane, 2-nitropropane, and the like;

and miscellaneous solvents such as propylene oxide, methylal, aniline and the like.

For a more complete listing of solvents that may be employed see *The Technology of Solvents and Plasticizers* by Arthur K. Doolittle, John Wiley and Sons, Inc., New York. It has been found that by employing such coupling solvents that there is an increased rate of deposition and films of ¼ inch in thickness are readily provided in relatively short deposition times.

The polymerization reaction is otherwise carried out in conventional manner, utilizing heat and/or catalysts and varying solvents and techniques. Generally, a free-radical catalyst, such as cumene hydroperoxide, benzoyl peroxide or similar peroxygen compound, or an azo compound, is employed. When the polymerization reaction and the reaction with imine are conducted concurrently as described above, azo compounds, and especially alpha, alpha-azobis(isosbutyronitrile), are preferred as the catalyst.

The percent of the various components employed in the dispersion herein can vary somewhat depending on the particular monomers utilized. The total solids content by weight may be as low as about 10 percent to about 65 percent, but the preferred content is from about 35 percent to about 55 percent. When an imine is employed to impart the basic nitrogen groups the imine content is from about 0.25 percent to about 6 percent by weight based on the weight of the total polymer. However, when an alpha,beta-ethylenically unsaturated monomer is used to impart the basic nitrogen groups as much as 100 percent of the monomer or monomers may be employed. The organic dispersion liquid may comprise from about 90 percent to about 35 percent based on weight of the polymer and the dispersion liquid. When a coupling solvent is utilized the amount employed will depend on the quantitative charge on the dispersion particles but generally an amount used may as much as a ⅓ or more based on weight of the dispersion liquid. The dispersion stabilizer is usually present in an amount of from about 0.5 percent to about 30 percent by weight based on total polymer content, however, the preferred amount is from about 5 percent to about 7 percent.

When the polymerization is complete, the polymer dispersion may then be thinned if desired with an organic solvent comprising a coupling solvent and liquid aliphatic hydrocarbon. The liquid aliphatic hydrocarbon is as disclosed hereinabove.

The articles to be coated are immersed in an electrodeposition comprising the non-aqueous dispersion described above and when a potential is applied the dispersed particles migrate to the cathode. As mentioned hereinabove, this reaction is reversible and the film thickness will depend on the voltages employed and the dwell time in the bath.

Voltages employed may be as low as 50 volts or lower to as high as 750 volts or higher may readily be utilized in this invention. Likewise, the dwell time in the electrocoating bath may vary from as low as few seconds to as high as several minutes or even longer depending on the desired results. The solids content of the bath may be as low as 10 percent or lower to as high as 65 percent; however, for purposes to this invention, the preferred solids content is from about 35 percent to about 55 percent.

After satisfactory film build has been obtained, the article is withdrawn from the bath and baked at a suitable temperature.

Generally, the compositions of the invention may be baked from as low as 20 minutes at 250°F. or lower to as high as 2 minutes at 500°F. or higher.

As mentioned hereinabove, these non-aqueous dispersions are readily adaptable to pigmentation.

Conventional pigments known in the art may be utilized, for example, iron oxide, encapsulated aluminum, lead silica chromate, carbon black, titanium dioxide, talc, barium sulfate, and the like, as well as combinations of these and similar pigments may be used. Color pigments, such as cadmium red, cadmium yellow, phthalocyanine blue, phthalocyanine green, chrome yellow, toluidene red, hydrated iron oxide, and the like may be included, if desired. Also generally incorporated into the pigment composition is a dispersing agent or surface-active agent.

Other components which may be included in the coating composition include, for example, wetting agents, flow agents, and the like.

The pigment-to-binder ratios are not critical in this invention, but the preferred ratio is from about 0.2 to 1.0 to about 0.55 to 1.0, although ratios as high as 1.2 to 1.0 and even higher have been used, and it is also possible to use ratios much lower than 0.2 to 1.0, but this will depend on part upon the pigments employed and the hiding desired.

The final electrocoating bath composition usually comprises the polymer dispersion, the dispersion liquid, optional coupling solvents and chemical plasticizers for the dispersion polymer particles and pigment, if desired. The chemical plasticizers may be any of the conventional plasticizers which are generally medium molecular weight esters and are not highly volatile and are materials in which acrylic polymers are soluble. Examples of plasticizers which may be used as phthalates, such as dibutyl phthalate, diisooctyl phthalate, decyl butyl phthalate; adipates such as diisooctyl adipate and dioctyl adipate; sebacates such as dibutyl sebacate and dioctyl sebacate; benzoates such as butyl benzoate, trimellitates such as triisooctyl trimellitate, n-octyl n-decyl trimellitate and others such as tricresyl phosphate, and the like. A more comprehensive discussion of the chemical plasticizers described herein may be found in *Organic Coating Technology*, Vol. 1, by Payne, in pages 389-391.

The relative amounts of plasticizer and pigment dispersion may be varied over a broad range. Generally, the plasticized acrylic polymer dispersion contains up to about 26 to 30 percent by weight of the plasticizer.

The total bath composition to be electrocoated comprises from about 20 percent to about 55 percent by weight of the plasticized acrylic polymer dispersion and about 45 percent to about 80 percent of the solvent thinner.

The final bath composition (polymer dispersion) to be modified by the incorporation of drying oils, waxes (e.g., hydrocarbon, chlorinated hydrocarbon, and ester types), pigments, fillers, dyes, as well as plasticizers and polymeric or resinous materials which are soluble in the hydrocarbon liquid vehicle, including fatty-acid modified shellac, gums, natural resins, waxes, asphalt, bitumen, coal tar, cumarone-indene resins, epoxidized fatty oils, epoxy resins, organic solvent-soluble alkylated methlolated aminoplast resins including the condensates of formaldehyde with urea, melamine, thiourea, benzoguanamine, ethylene urea, alkylated with an alcohol having 2 to 6 carbono atoms such as n-butanol. Among other materials that can be incorporated are the alkyds, organic solvent-soluble vinyl and acrylic resins with or without plasticizers, including plastisols obtained from polyvinyl chloride or copolymers or vinyl chloride and plasticizers therefor.

The following examples set forth specific embodiments of the instant invention. However, the invention is not to be construed as being limited to these embodiments for there are, of course, numerous possible variations and modifications. All parts and percentages in the examples, as well as throughout the specification, are by weight unless otherwise indicated.

EXAMPLE I

| | Parts by Weight |
|---|---|
| Solvent blend* | 403 |
| Coconut alkyd plasticizer** | 60 |
| Ultraviolet absorber (tinuin) | 6 |
| Non-aqueous dispersion¹ (below) | 234 |
| Non-aqueous dispersion² (below) | 315 |
| Pigment paste (below) | 20 |

*The solvent blend was comprised of 50 parts butyl cellosolve, 40 parts hipflash naphtha and 10 parts trimethyl pentanediol mono-isobutyrate.
**Comprised of 175.5 parts coconut oil, 106.0 parts neopentyl glycol, 171.1 parts phthalic anhydride and 18.2 parts gylcerine in 112.5 parts xylene.

1. Dispersion comprising:

| 52.6% solids content | 92.5% methyl methacrylate |
|---|---|
| | 0.7% methacrylic acid-hydroxyethyl ethylenimine (1:1 weight ratio) |
| | 6.8% stabilizer A (below) |
| 47.4% solvents | 43.3% hexane |
| | 21.7% heptane |
| | 21.7% aliphatic hydrocarbon medium boiling (205-238°F.) |

Stabilizer A was comprised of:

| 36.4% solids content | 44.0% methacrylic acid |
|---|---|
| | 4.9% glycidyl methacrylate |
| | 50.4% stabilizer intermediate (below) |
| 63.4% solvents | 9.7% methacrylic acid |
| | 55.0% butyl acetate |
| | 20.0% ethyl acetate |

Stabilizer intermediate was comprised of:

| 53.3% solids content | 90.3% 12-hydroxystearic acid |
|---|---|
| | 9.7% glycidyl methacrylate |
| | 81.8% V, M & P naphtha |
| | 18.2% toluene |

2. Dispersion Comprising:

| 40.4% solids content | 76.5% methyl methacrylate |

EXAMPLE 1—Continued 6.8% Stabilizer A,
solids (above)
16.0% butyl acrylates
.7% methacrylic acid-
hydroxyethyl ethylen-
imine (1:1 weight ratio)

Pigment Paste

A medium blue metallic paste was prepared from the following components:

| | Parts by Weight |
|---|---|
| Component A | 9.40 |
| Component B | 164.80 |
| Component C | 28.35 |
| Component D | 16.20 |
| Aluminum paste (Reynolds Metals -8-231) | 89.70 |
| Aluminum paste (Reynolds Metals -LSA-618) | 16.27 |

Component A was comprised of 15% of phthalocyanine green; 21% of 49.4% solids content pigment dispersant comprising 39.0% methyl methacrylate, 13.0% glycidyl methacrylate, 42.0% polyhydroxy stearic acid, and 6.0% p-nitro benzoic acid reduced in a solvent blend comprising 80.8% Solvesso 150, 4.5% Shellsol B, 3.3% toluene, 6.2% Shellsol 71 and 5.2% Isopar E; and 38% xylene.

Component B was comprised of 15% of phthalocyanine blue, 21% pigment dispersant as in Component A and 38% xylene.

Component C was comprised of 5% thiofast red, 20% pigment dispersant as in Component A and 38% xylene.

Component D was comprised of 5% carbon black, 20% pigment dispersant as in Component A and 50% xylene.

The aluminum pastes herein was admixed with the color pigment pastes and agitated for about 1 hour.

This example was electrodeposited at a voltage of 550 volts for 5-6 minutes on a cold rolled steel panel. A film of 5.2 mils was deposited at the cathode while the maximum current draw was only 0.1 milliamps. When such films were baked for 30 minutes at 300°F., they were smooth and had a good appearance. During the deposition of these films, no heating of the bath or stirring was required.

EXAMPLE II

This example was a white non-aqueous dispersion comprised of the following:

| | Parts by Weight |
|---|---|
| Solvent blend (as in Example I) | 317 |
| Coconut alkyd plasticizer (as in Example I) | 20 |
| Non-aqueous dispersion¹ (as in Example I) | 78 |
| Non-aqueous dispersion² (as in Example I) | 105 |
| Pigment paste (below) | 60 |

Pigment Paste

This white paste was comprised of 75.0% titanium dioxide; 2.1% pigment dispersant as in Component A of Example I, 0.15% low molecular weight polyethylene solution and 22.7% high flash, V, M and P naphtha.

Employing conventional means, the paste was ground in a ball mill overnight until a suitable grind was obtained (Hegman Gauge at least 6.0).

This non-aqueous dispersion composition was electrodeposited by employing 550 volts for 5 minutes. After baking for 30 minutes at 300°F., a dry film thickness of 2.85 mils was obtained. The film produced was tough even at such high film thickness.

EXAMPLE III

In this example, the composition for Example I was electrodeposited over a primer composition which had been previously electrodeposited and cured. The primer composition had been deposited from a 12% solids content aqueous bath comprised of a pigmented maleinized-linseed-piccodiene interpolymer.

The interpolymer was comprised of 74.6% linseed oil, 8.29% Piccodiene, 15.75% maleic anhydride and 1.35% hydrogenated Bisphenol A. The pigment to binder to this composition was 0.23:1.0 and the pigment was comprised of 67% pigmentary coal dust, 3% montmorillonite clay, modified with trimethyl octyl ammonium ions and containing 0.65 percent nitrogen (Bentane 11), 12% basic lead silicate and 18% strontium chromate. This composition was deposited on the anode at 200 volts and was subsequently cured at 365°F. for 25 minutes to provide films of 1.0 mil thickness.

These coated panels were immersed in the non-aqueous dispersion of this invention (Example I), connected to the cathodic terminal and subjected to a voltage of 550 volts for 5 minutes. The coatings obtained were baked 30 minutes at 300°F. to provide films 2.1 mils thick and panels that were subjected to this voltage for 6½ minutes provided films that when baked were 3.5 mils thick. It was surprising to note that the electrodeposited non-aqueous dispersion had excellent adhesion to the electrocoated primer for in the past great difficulty has been experienced in obtaining good intercoat adhesion between the primer and top coat.

EXAMPLE IV

This example was similar to that of Example III except that the non-aqueous dispersion composition was that of Example II. The electrodeposited primer was immersed in the non-aqueous dispersion, subjected to 550 volts for 5 minutes and subsequently baked for 30 minutes at 300°F. to provide film 2.50 mils thick. Likewise, this non-aqueous dispersion showed good adhesion to the primer, as well as good flow and uniform deposition over the entire surface, even in absence of continuous stirring or agitation.

EXAMPLE V

This is an example of a 30% solids content non-aqueous clear comprising:

| | Parts by Weight |
|---|---|
| Solvent blend (as in Example I) | 129 |
| Coconut alkyd plasticizer (as in Example I) | 20 |
| Non-aqueous dispersion¹ (as in Example I) | 78 |
| Non-aqueous dispersion² (as in Example I) | 105 |

This clear composition was deposited over for an electrodeposited primer as described in Example I. In this instance, after a deposition time of 5 minutes at 550 volts, a film build of 0.4 mils was obtained. Again excellent adhesion and flow were noted.

EXAMPLE VI

This example was similar to that of Example V, except that dispersion 1 and 2 were utilized in a 1 to 1 weight ratio. When deposited at 550 volts of 5 minutes, a film of about 2.7 mils was obtained. This film was of similar quality to that for Example V.

An example of a non-aqueous dispersion composition comprising a basic nitrogen-containing compound other than an imine is a comparison having N,N-dimethylaminoethyl methlacrylate herein. Such a non-aqueous dispersion composition is comprised as follows:

|  | Parts by Weight |
| --- | --- |
| Methyl methacrylate | 88 |
| Butyl acrylate | 10 |
| N,N-dimethylaminoethyl methacrylate | 2 |
| Stabilizer A (Example I) | 6.6 |
| Plasticizer* | 20.3 |

*Eighty-five percent solids content in xylene comprising: 36.59 percent ester-diol' - pelorgonate; ester diol phthalate; trimethylolpropane phthalate; and 2.49 percent excess trimethylolpropane.

This dispersion was utilized in formulating the following non-aqueous dispersion electrodepositable coating composition.

EXAMPLE VII

|  | Parts by Weight |
| --- | --- |
| Solvent blend (Example I) | 166.5 |
| Non-aqueous dispersion (above) | 167.0 |
| Pigment paste (Example I) | 6.5 |

When this composition was electrodeposited on steel panels employing 500 volts of 30 seconds and 5 minutes, films having thickness of 1.6 and 12 mils, respectively, were obtained when baked for 30 minutes at 300°F. These films had a good appearance and deposited in a uniform manner.

Tables 1 and 2 below show the influence of deposition time and voltage on film build. The non-aqueous dispersion of Example I was employed for this purpose.

Table 1

| Volts | Time (minutes) | Thickness (mils) |
| --- | --- | --- |
| 550 | 5 | 4.0 |
| 400 | 5 | 3.4 |
| 200 | 5 | 1.9 |

Table 2

| Volts | Time (minutes) | Thickness (mils) |
| --- | --- | --- |
| 550 | 6 | 5.0 |
| 550 | 5 | 4.0 |
| 550 | 3 | 2.2 |

Thus, it can be observed from the data that as the dwell time increases so does the film's thickness, accordingly. And, likewise, as the voltage increases, so does the film thickness. Since the resistivity of the deposited film is believed to be substantial similar to that of the bath, and no insulation of the substrate takes place, thus films having increased thickness, when compared to non-reversible deposited composition which insulate the electrode, are readily obtainable.

Below are several examples of non-aqueous acrylic polymers that may be utilized in addition to or in place of those employed above.

Polymer Dispersion A

An acrylic polymer dispersion was prepared in the following manner:

A container was charged with 612 grams of Napoleum 30 (an aliphatic hydrocarbon having a boiling point of 205° - 234°F.), 306 grams of heptane, 306 grams of hexane, 64.8 grams of methyl methacrylate, 16.7 grams of a dispersion stabilizer prepared by reacting 50 parts of the reaction product of 9 parts of polyhydroxy stearic acid and 1 part of glycidyl methacrylate with 45 parts of methyl methacrylate and 5 parts of glycidyl methacrylate and reacting the product of that reaction with methacrylic acid, and 4.6 grams of azobis (isobutyronitrile). The mixture was heated at 86°C. for 20 minutes. A mixture of 1383 grams of methyl methacrylate, 11 grams of methacrylic acid, 288 grams of the same dispersion stabilizer, 3 grams of octyl mercaptan, and 4.6 grams of azobis (isobutyronitrile) were added dropwise over the next 3 hours at a temperature of 86°C. The mixture was refluxed for one-half hour at 86.5°C. and 6 cubic centimeters of 2-hydroxy ethyl ethylene imine were added. After refluxing at 87°C. for an additional one-half hour, 5 cubic centimeters of 2-hydroxyethyl ethylene imine were added, and the reaction was continued at 87°C. for 3 additional hours.

Polymer Dispersion B

An acrylic polymer dispersion was prepared in the following manner:

A container was charged with 612 grams of Napoleum 30, 306 grams of heptane, 306 grams of hexane, 64.8 grams of methyl methacrylate, 15.7 grams of a dispersion stabilizer comprising 108.5 parts of the reaction product of polyhydroxy stearic acid and glycidyl methacrylate, 50 parts of methyl methacrylate, 5.6 parts of glycidyl methacrylate, 1.1 parts of methacrylic acid, 2.2 parts of azobis(isobutyronitrile), 10.4 parts of hydroquinone, 51 parts of N,N-dimethyl coconut amine, 137 parts of butyl acetate, and 40 parts of ethyl acetate, and 4.6 grams of azobis(isobutyronitrile) catalyst. The mixture was heated at 86°C. for one-half hour. A mixture of 1383 grams of methyl methacrylate, 11 grams of methacrylic acid, 271 grams of the dispersion stabilizer, 3 grams of octyl mercaptan, and 4.6 grams of azobis(isobutyronitrile) were added dropwise over the next 3 hours at a temperature of 86°C. The mixture was refluxed for a half hour at 86.5°C. and 6 cubic centimeters of 2-hydroxy ethyl ethylene imine were added. After refluxing at 87°C. for an additional three-quarters hour, 11 cubic centimeters of 2-hydroxy ethyl ethylene imine and 64 grams of isopropyl alcohol were added and the reaction was continued at 87°C. for 3 additional hours.

The above acrylic polymer dispersion was found to be stable when reduced to 25 percent solids content by the addition of Cellosolve acetate.

Polymer Dispersion C

An acrylic polymer dispersion was prepared in the following manner:

A container was charged with 612 grams of Napoleum 300, 306 grams of heptane, 306 grams of hexane, 64.8 grams of methyl methacrylate, 15.7 grams of the dispersion stabilizer used in Example 2, and 4.6 grams of azobis(isobutyronitrile). The mixture was heated at 86°C. for one-half hour. A mixture of 1383 grams of methyl methacrylate, 11 grams of methacrylic acid, 271 grams of the dispersion stabilizer, 3 grams of octyl mercaptan, 11 grams of 2-hydroxy ethyl ethylene imine, and 4.6 grams of azobis(isobutyronitrile) were added dropwise over the next 3½ hours at a temperature of 86°C. The mixture was refluxed for an additional 1½ hours at 86°C.

The above acrylic polymer dispersion was found to be stable, when diluted to 25 percent solids content by the the addition of Cellosolve acetate.

Likewise, various other components may be added, for example, plasticizer, such as dibutyl phthalate, diisooctyl phthalate and the like; other pigments, fillers, dyes and the like; other resinous materials such as fatty-acid modified shellac, waxes, bitmen, exposy resins, alkylated methlolated aminoplast resins including the condensates of formaldehyde with urea, melamine or benzoquanamine and the like; and other formulating aids well known in the art.

Also, the non-aqueous dispersions of this invention may be deposited on articles primed with compositions other than those disclosed herein. For example, any article which is capable of carrying a charge, whether primed with an electrodeposited or conventional applied primer, may be coated by the method described herein.

Thus, paper, mylar films and the like, when fastened to a metal panel, may be coated by the method herein and subsequently removed. Films 5–6 mils in thickness have readily been obtained in short deposition times.

According to the provisions of the patent statutes, there is described above the invention and what are now considered to be its best embodiments. However, within the scope of the appended claims, it is to be understood that the invention can be practiced otherwise than as specifically described.

We claim:

1. A method of coating a conductive substrate which comprises passing an electric current between an electrically conductive electrode and an electrically conductive counter electrode in electric contact with a non-aqueous coating composition comprising a dispersion of a polymer
   a. which contains basic nitrogen atoms; and
   b. which contains a dispersion stabilizer in an organic dispersion liquid, said dispersion stabilizer being a branched copolymer containing two polymeric segments wherein one segment is solvated by the organic dispersion liquid and wherein the second segment is
   c. an anchor polymer of different polarity to the first segment;
   d. relatively non-solvatable by the organic dispersion liquid; and
   e. anchored to said polymer by the copolymerization of pendant groups which are a part of said anchor polymer with ethylenically unsaturated monomers which are employed in forming said polymer.

2. A method as in claim 1 wherein the dispersion has a solids content of from about 10 to about 65 percent by weight.

3. A method as in claim 1 wherein the polymer is an imine-modified interpolymer of:
   a. a polymerizable ethylenically unsaturated carboxylic acid; and
   b. at least one other polymerizable ethylenically unsaturated monomer.

4. A method as in claim 3 wherein the monomer comprises methyl methacrylate or butyl methacrylate.

5. A method as in claim 3 wherein the acid comprises acrylic acid or methacrylic acid.

6. A method as in claim 3 wherein the imine is 2-hydroxyethyl ethylenimine or ethylenimine.

7. A method as in claim 1 wherein the polymer contains at least a portion thereof derived from an ethylenically unsaturated basic nitrogen-containing monomer.

8. A method as in claim 7 wherein the monomer is N,N-dimethylamine methacrylate.

9. A method as in claim 1 wherein the dispersion stabilizer is formed by graft copolymerizing (A) the reaction product of glycidyl methacrylate and poly-12-hydroxy stearic acid and (B) the reaction product of methyl methacrylate, glycidyl methacrylate, and the copolymer product containing pendant epoxy groups is reacted with methacrylic acid.

10. A method as in claim 1 wherein the dispersion has as an additional component a coupling solvent.

11. A method as in claim 10 wherein the coupling solvent has a limited affinity for the interpolymer and a limited solubility in the water.

12. A method as in claim 11 wherein the coupling solvent is selected from a member of the group consisting of ketones, ethers, esters, alcohols and nitrocarbons.

13. A method as in claim 12 wherein the coupling solvent is ethylene glycol monoethyl ether acetate, ethylene glycol monobutyl ether acetate or isopropyl alcohol.

14. A method as in claim 1 wherein the organic dispersing liquid is selected from a member of the class consisting of aliphatic hydrocarbons, aromatic hydrocarbons naphthenic hydrocarbons or mixture thereof.

15. An article of manufacture comprising a substrate having thereon an electrodeposited coating applied by passing an electric current between an electrically conductive electrode and an electrically conductive counter electrode in electric contact with a non-aqueous coating composition comprising a dispersion of a polymer
   a. which contains basic nitrogen atoms; and
   b. which contains a dispersion stabilizer in an organic dispersion liquid, said dispersion stabilizer being a branched copolymer containing two polymeric segments wherein one segment is solvated by the organic dispersion liquid and wherein the second segment is
   c. an anchor polymer of different polarity to the first segment;
   d. relatively non-solvatable by the organic dispersion liquid; and
   e. anchored to said polymer by the copolymerization of pendant groups which are a part of said anchor polymer with ethylenically unsaturated monomers which are employed in forming said polymer.

16. An article as in claim 15 wherein the dispersion has a solids content of from about 10 to about 65 percent by weight.

17. An article as in claim 15 wherein the polymer contains at least a portion thereof derived from an ethylenically unsaturated basic nitrogen-containing monomer.

18. An article as in claim 15 wherein the dispersion stabilizer is formed by graft copolymerizing (A) the reaction product of glycidyl methacrylate and poly-12-hydroxy stearic acid and (B) the reaction product of methyl methacrylate, glycidyl methacrylate, and the copolymer product containing pendant epoxy groups is reacted with methacrylic acid.

19. An article as in claim 15 wherein the dispersion has as an additional component a coupling solvent which has a limited affinity for the interpolymer and a limited solubility in the water.

20. An article as in claim 15 wherein the polymer is an imine-modified interpolymer of:
   a. a polymerizable ethylenically unsaturated carboxylic acid; and
   b. at least one other polymerizable ethylenically unsaturated monomer.

21. An article as in claim 20 wherein the monomer (b) comprises methyl methacrylate or butyl methacrylate.

22. An article as in claim 20 wherein the acid comprises acrylic acid or methacrylic acid.

23. An article as in claim 20 wherein the imine is 2-hydroxyethyl ethylenimine or ethylenimine.

24. An article as in claim 23 wherein the monomer is N,N-dimethylamine methacrylate.

* * * * *